United States Patent [19]

Weise et al.

[11] 4,316,641
[45] Feb. 23, 1982

[54] CIRCUIT FOR THE SHUTDOWN OF AN ANTI-LOCKUP PROTECTED VEHICLE BRAKE UNIT IN CASE OF DISTURBANCE

[75] Inventors: Lutz Weise, Mainz; Johann Rothen, Nordstemmen, both of Fed. Rep. of Germany

[73] Assignee: WABCO Fahrzeugbremsen GmbH, Hanover, Fed. Rep. of Germany

[21] Appl. No.: 10,653

[22] Filed: Feb. 9, 1979

[51] Int. Cl.³ .............................................. B60T 8/10
[52] U.S. Cl. ...................................... 303/92; 303/119
[58] Field of Search .................. 303/92, 109, 119, 95, 303/96

[56] References Cited

U.S. PATENT DOCUMENTS

| | | | |
|---|---|---|---|
| 3,838,889 | 10/1974 | Miller | 303/109 |
| 3,870,376 | 3/1975 | Riordan | 303/92 |
| 3,920,284 | 11/1975 | Lane et al. | 303/92 |
| 4,049,325 | 9/1977 | Reinecke | 303/92 |
| 4,085,979 | 4/1978 | Leiber et al. | 303/92 |

Primary Examiner—J. D. Miller
Assistant Examiner—Reinhard J. Eisenzopf
Attorney, Agent, or Firm—G. J. Falce

[57] ABSTRACT

An improved vehicle wheel anti-lockup brake control system in which a shutdown signal is generated to disable the wheel anti-lockup control system in the event of a malfunction, as determined by the concurrent presence of a wheel slip signal and a low wheel speed signal (generated by the same wheel) for a predetermined period of time sufficient to allow a normally operative anti-lockup control system to correct a slipping wheel before it locks up.

4 Claims, 1 Drawing Figure

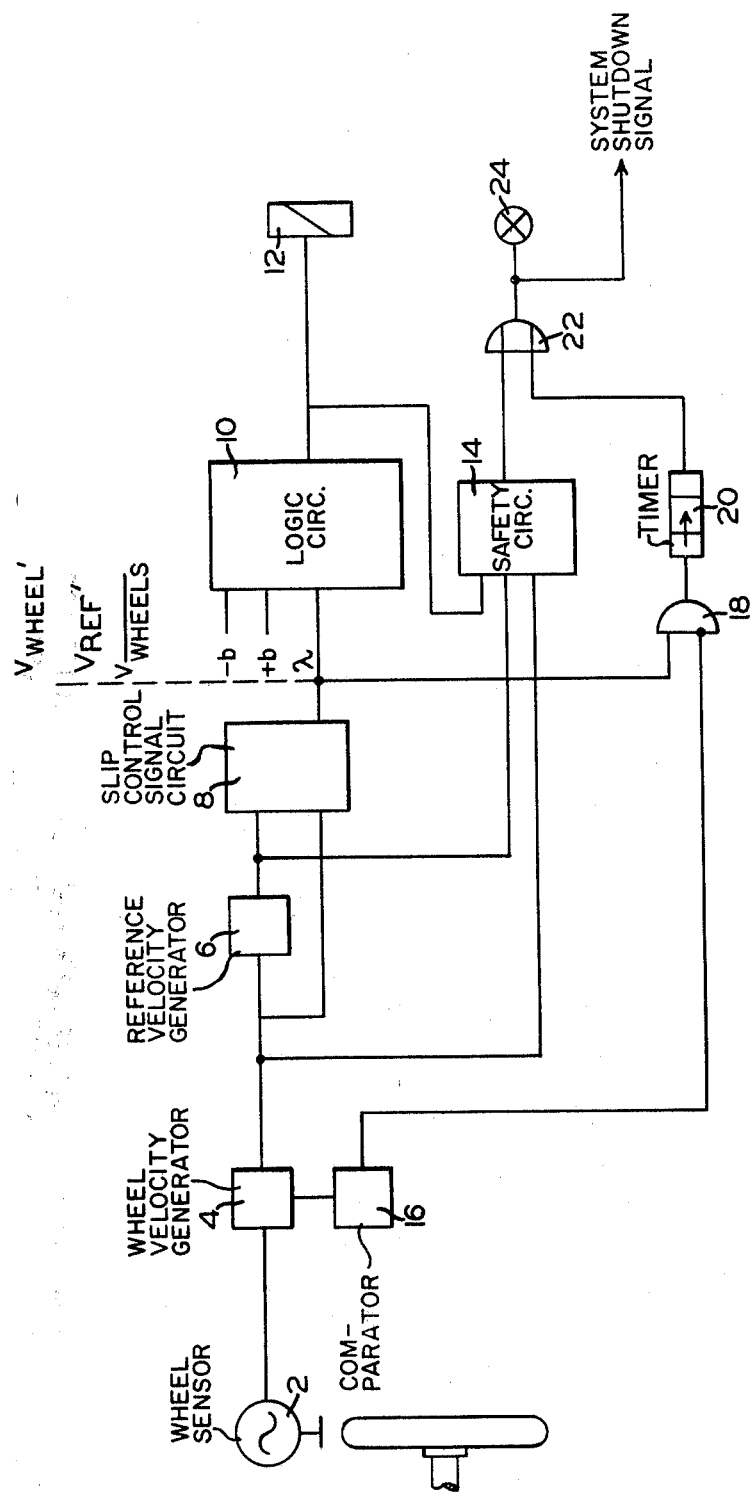

CIRCUIT FOR THE SHUTDOWN OF AN ANTI-LOCKUP PROTECTED VEHICLE BRAKE UNIT IN CASE OF DISTURBANCE

BACKGROUND OF THE INVENTION

The invention relates to anti-lockup protected vehicle brake systems with at least one wheel sensor for monitoring the rotational behavior of at least one vehicle wheel, with a circuit for obtaining the rotational speed of the wheel, with a reference velocity circuit for simulating the vehicle speed, with a circuit for providing a slippage control signal when the wheel velocity and vehicle reference velocity signals differ by a predetermined amount, and with a logic circuit for evaluating the slippage control signal and wheel acceleration and deceleration signals in order to control solenoid valves for the regulation of the brake pressure.

In anti-lockup protected vehicle brake systems, a disturbance may arise that causes the wheels of one axle to lock up while the wheels of another axle are controlled, thereby resulting in directional instability. For example, in so-called diagonal-individual regulation systems (DIR systems), which consist of only two control circuits that are arranged diagonally and in which case a sensor is located at the right wheel of the front axle and at the left wheel of the rear axle, and in which case the individual additional wheel(s) of the same axle are controlled by the regulated wheel, there exists the danger that in case of a malfunction leading, for example, to lockup of the rear axle, the vehicle will exhibit unstable motion behavior because the front axle in this case continues to be controlled.

A circuit for monitoring the duty cycle of the solenoid as a way of recognizing such troubles, is known, but has the disadvantage of a relatively large amount of time elapsing until recognition of the disturbance, so that the onset of unstable motion behavior cannot be prevented.

Further, the suggestion has already been made, to provide for a selective shutdown. In this way a minor reduction of the maximal engagement time of the solenoids can indeed be achieved, but the lower limit of the defect-recognition time is determined by the total wheel slippage period, which means that the time to shutdown in case of trouble is still so great that directional instability cannot be avoided.

SUMMARY OF THE INVENTION

Therefore, the task of the present invention is to improve a circuit of the type mentioned in such a way that a malfunction of the anti-lockup system is quickly detected to effect system shutdown in the presence of trouble, so that directional instabilities can be safely avoided.

This is accomplished in the present invention by determining whether the wheel speed remains below a certain threshold in the presence of a wheel slip control signal longer than a predetermined period of time, as a means of detecting a malfunction of the anti-lockup control system, thus allowing shut down of the brake unit immediately. The predetermined time period here must be so selected that even in the case of extreme frictional discontinuities the lockup time of the wheel would normally remain below this period of time.

By means of the solution according to the invention, the time from the appearance of a system malfunction leading to lockup of a wheel or of the wheels of an axle until the recognition of such malfunction is considerably shortened, thus providing for faster shutdown of the anti-lockup system and, consequently, better directional stability than heretofore possible.

BRIEF DESCRIPTION OF THE DRAWINGS

These and other objects and attendant advantages will become apparent from the following detailed description of the invention, with reference to the accompanying single FIGURE drawing showing a block diagram of an anti-lockup wheel protection control circuit embodying the present invention.

DESCRIPTION AND OPERATION

A wheel sensor 2 in proximity with a wheel of the vehicle monitors the rotational behavior of the wheel. A wheel velocity generator circuit 4 is connected to the output of wheel sensor 2, and produces at its output a wheel speed signal corresponding to the angular or rotational velocity of the wheel being monitored. This wheel speed signal is connected to a reference velocity generator circuit 6, which forms therefrom a reference velocity signal at its output corresponding to the speed of the vehicle. The wheel speed and vehicle velocity signals are connected to a slip control circuit 8, which produces at its output a wheel slip signal λ any time the wheel speed is a predetermined amount less than the vehicle speed. This wheel slip signal λ, as well as a wheel deceleration signal −b and a wheel acceleration signal +b, which represent wheel deceleration and acceleration rates in excess of a predetermined amount, are connected to a logic circuit 10, which evaluates these input signals in terms of detecting the condition of rotation of the wheel being monitored. Details of the afore-mentioned circuits represented by blocks 4, 6, 8, and 10 are deemed unnecessary, as these circuits and their arrangement are conventional and well-known to those skilled in the art; also, only the above brief description is believed necessary to provide an understanding of the basic wheel anti-lockup operation. The output of logic circuit 10 represents signals controlling solenoids 12 associated with wheel brake pressure modulator valves (not shown), also conventional and well-known both in their construction and operation.

Modern anti-lockup protected vehicle brake systems generally also have a safety circuit 14 that need not be gone into in detail here.

Unlike what is represented in the block diagram, the reference velocity can also be derived from several wheels.

Thus far the circuit corresponds to the previously known conventional construction. Now the invention further provides for a comparator 16 that is connected to the output of circuit 4, and in which the wheel velocity signal is compared with a predetermined threshold value, for example 4 km/h. The output of the comparator 16 is now combined with the output of the circuit 8 for obtaining the slippage control signal, in an AND-gate 18, with the AND-gate input from the comparator inverted.

After the AND-gate 18, there is connected a timing element 20 with a predetermined time delay. The time delay may be, for example, 300 ms. This time is realistic since the time must be chosen of such duration that even in the case of extreme discontinuities of the friction value, the lockup time of the wheel is shorter than this chosen time duration.

The output of the timing element 20 is combined with the output of the safety circuit 14 in an OR-gate 22, by means of which a failure indicator 24 can be controlled and a switch (not shown) for shutdown of the brake-pressure control unit can be actuated.

The circuit according to the invention operates as follows. In the comparator 16, the wheel velocity is continuously compared with the predetermined threshold, which may be, for example, 4 km/h. If the threshold is not reached the comparator produces a LOW signal, which is indicative of an impending wheel lock-up condition. If there is simultaneously a slippage control signal to which the logic circuit 10 normally responds to correct an impending wheel lock-up, the AND-condition is satisfied at AND-gate 18 and the timing element 20 is triggered. During normal operation of the wheel anti-lockup system, the logic circuit 10 operates to correct the impending wheel lock-up within the alotted predetermined time period imposed by timer 20. If a malfunction of the wheel anti-lockup system exists, however, the impending wheel lock-up condition will still exist following expiration of the time period, so that the LOW output signal of the comparator 16 and the slippage control signal are simultaneously present at the AND-gate 18 longer than this period. The output signal of the timing element then actuates the failure indicator 24 and causes the shutdown of the wheel anti-lockup system, thus avoiding the possibility of directional instability.

We claim:

1. A circuit for detecting a malfunction in a wheel anti-lockup protected vehicle brake system so as to effect a shutdown of said system including:
  (a) at least one rotation sensor device to monitor the rotational behavior of at least one said wheel of said vehicle;
  (b) wheel velocity generator means to which said sensor device is connected for providing a wheel speed signal corresponding to the rotational velocity of said wheel;
  (c) reference velocity generator means to which said wheel speed signal is connected for providing a reference speed signal representative of the speed of said vehicle;
  (d) means subject to said wheel speed signal and said vehicle velocity signal for providing a wheel slip signal when the wheel rotational speed is less than the vehicle speed;
  (e) a logic circuit to which said wheel slip signal is connected in conjunction with a wheel deceleration signal and a wheel acceleration signal for evaluation in terms of determining the condition of rotation of said wheel; wherein the improvement comprises:
  (f) means for comparing said wheel speed signal with a predetermined threshold value; and
  (g) means for providing a shutdown signal to terminate operation of said wheel anti-lockup brake system in the event of a malfunction thereof, as indicated by said wheel speed signal being less than said threshold value concurrently with the presence of said wheel slip signal for a predetermined period of time.

2. A circuit as recited in claim 1, wherein said means for providing a shutdown signal comprises:
  (a) a comparator to which said speed signal is connected for comparison with a predetermined threshold value, said comparator providing a digital output signal in accordance with said wheel speed signal being greater or less than said threshold value;
  (b) an AND gate having inputs to which said wheel slip signal and said digital output signal are connected, and an output; and
  (c) timer means connected to the output of said AND gate for providing said shutdown signal when said AND gate is enabled for said predetermined time period.

3. A circuit as recited in claim 2, further comprising means for inverting said digital output signal of said comparator, whereby said AND gate is enabled by the presence of said wheel slip signal when said wheel speed signal is less than said predetermined threshold value.

4. A circuit as recited in claim 3, wherein said predetermined time period is greater than the time normally required for said anti-lockup system to cause said wheel slip signal to disappear.

* * * * *